(12) United States Patent
Sung et al.

(10) Patent No.: US 9,568,886 B2
(45) Date of Patent: Feb. 14, 2017

(54) METHOD OF PRINTING HOLOGRAPHIC 3D IMAGE

(75) Inventors: Gee-young Sung, Daegu (KR); Kyoung-seok Pyun, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 671 days.

(21) Appl. No.: 13/591,349

(22) Filed: Aug. 22, 2012

(65) Prior Publication Data

US 2013/0050790 A1    Feb. 28, 2013

(30) Foreign Application Priority Data

Aug. 24, 2011    (KR) ........................ 10-2011-0084820

(51) Int. Cl.
*G03H 1/04*    (2006.01)
*G03H 1/22*    (2006.01)

(52) U.S. Cl.
CPC ...... *G03H 1/0476* (2013.01); *G03H 2001/048* (2013.01); *G03H 2001/0415* (2013.01); *G03H 2001/2271* (2013.01); *G03H 2210/22* (2013.01); *G03H 2210/30* (2013.01); *G03H 2222/18* (2013.01)

(58) Field of Classification Search
CPC ..................... G03H 1/0476; G03H 2001/0478; G03H 2001/0479; G03H 2001/048; G03H 2001/0481; G03H 2001/0482
See application file for complete search history.

(56) References Cited

U.S. PATENT DOCUMENTS

| 6,330,088 | B1 | 12/2001 | Klug et al. |
| 6,509,983 | B1 * | 1/2003 | Klug ................ G03H 1/268 359/1 |
| 6,721,023 | B1 * | 4/2004 | Weiss et al. ............... 349/87 |
| 2008/0247017 | A1 | 10/2008 | Wu et al. |
| 2009/0195873 | A1 | 8/2009 | Kubara |
| 2011/0002020 | A1 | 1/2011 | Khan |

FOREIGN PATENT DOCUMENTS

KR    10-2010-0073173    7/2010

OTHER PUBLICATIONS

"What is 3D printing?" available at http://3dprinting.com/what-is-3d-printing/ (retrieved Mar. 2015).*

* cited by examiner

*Primary Examiner* — Jennifer L. Doak
(74) *Attorney, Agent, or Firm* — NSIP Law

(57) ABSTRACT

A method of printing a holographic 3D image is provided. The method includes forming sub-voxels on a hologram recording material, the sub-voxels including one or more colors.

26 Claims, 11 Drawing Sheets

METHOD OF PRINTING HOLOGRAPHIC 3D IMAGE

CROSS-REFERENCE TO RELATED APPLICATIONS

This application claims the benefit under 35 U.S.C. §119 (a) of Korean Patent Application No. 10-2011-0084820, filed on Aug. 24, 2011, in the Korean Intellectual Property Office, the entire disclosure of which is incorporated herein by reference for all purposes.

BACKGROUND

1. Field

The following description relates to methods of printing holographic 3D images.

2. Description of Related Art

Recently, interest with respect to 3-dimensional (3D) stereoscopic images has been growing. As a result, development of display apparatuses configured to embody 3D stereoscopic images has increased. Research is being conducted regarding embodiment of real and natural stereoscopic images based on multi-view images. For example, when a number of view points increases, stereoscopic images become more natural, but deteriorate in quality. Therefore, since a hologram recording material has the ability to embody high-quality, real, and natural stereoscopic images, the printing of holographic 3D images is being researched.

FIG. 1 is a schematic view illustrating an example of a general holographic 3D image printer. Referring to the example illustrated in FIG. 1, the general holographic 3D image printer includes a light source 10, an optical system, a printer head, and a hologram recording material 50. Here, the optical system includes a beam splitter 40, reflection mirrors 12 and 22, and lenses 23 and 24. The printer head includes a spatial light modulator (SLM) 30 and an object lens 25. Here, the light source 10 includes red, green, and blue laser light sources 10R, 10G, and 10B.

In an example, light of a predetermined color from the light source 10 is split into a reference light 11 and a material light 21 by the beam splitter 40. The reference light 11 is incident to a predetermined location on the hologram recording material 50 via the reflection mirror 12. Further, the material light 21 is incident to the SLM 30, on which color data regarding a predetermined color is displayed, via the reflection mirror 22 and the lenses 23 and 24. The material light 21 modulated by the SLM 30 passes through the object lens 25 and is incident to the hologram recording material 50. Here, an interference pattern between the reference light 11 and the material light 21 is printed on the location at which the reference light 11 and the material light 21 are incident to the hologram recording material 50. Accordingly, when respective interference patterns for three colors, e.g., red light, green light, and blue light, are printed on the hologram recording material 50, a voxel 60, which is a unit of a 3D stereoscopic image, is formed.

The voxel 60 is a pixel in 3D space, or a volume pixel including graphic data that defines unit volume in 3D space. When the hologram recording material 50 is moved in the x-axis direction or the y-axis direction to print the interference patterns on the hologram recording material 50 in correspondence to all locations of an actual 3D image, a voxel 2-dimensional (2D) array configuration, in which a plurality of voxels 60 is 2-dimensionally arranged, is formed on the hologram recording material 50.

As described above, the general holographic 3D image printer forms the plurality of voxels 60, including graphic data regarding an actual 3D image, on the hologram recording material 50. Here, the voxels 60 include graphic data corresponding to different locations of an actual 3D image, respectively. In an example, each of the voxels 60 generally includes color data of three or more colors.

FIG. 2 is a diagram illustrating an example of a person recognizing a 3D image from a hologram recording material 50 printed by the general holographic 3D image printer illustrated in FIG. 1. Referring to the example illustrated in FIG. 2, a reference light used to record a hologram to the hologram recording material 50 is irradiated to recover a 3D stereoscopic image from the hologram recording material 50 at which a voxel 2D array configuration consisting of the plurality of voxels 60 is formed.

FIG. 3 is a diagram illustrating an example of a general voxel 2D array configuration formed on a hologram recording material 50. Referring to the example illustrated in FIG. 3, while not limited thereto, each of the voxels 60 include red R, green G, and blue B color data. Here, the voxels 60 of the general voxel 2D array configuration include different pieces of location data.

FIG. 4 is a flowchart illustrating an example of a method of forming the voxel 2D array configuration as illustrated in FIG. 3. Referring to FIGS. 1 and 4, after color data regarding red color of a predetermined location of an actual 3D image is displayed (71) on the SLM 30, the red laser light source 10R emits red light that passes through the SLM 30, and records (72) color data regarding red color on the hologram recording material 50. After color data regarding green color of a predetermined location of an actual 3D image is displayed (73) on the SLM 30, the green laser light source 10G emits green light that passes through the SLM 30, and records (74) color data regarding green color on the hologram recording material 50. Next, after color data regarding blue color of a predetermined location of an actual 3D image is displayed (75) on the SLM 30, the blue laser light source 10B emits blue light that passes through the SLM 30, and records (76) color data regarding blue color on the hologram recording material 50. Therefore, the voxel 60, including red, green, and blue color data regarding a predetermined location of an actual 3D image, is formed on the hologram recording material 50.

Next, after the hologram recording material 50 is moved in the x-axis direction or the y-axis direction by the size of a voxel, the voxel formation as described above is performed. According to the example illustrated in FIG. 3, by repeating the voxel formation and the movement of the hologram recording material 50, the voxel 2D array configuration, in which the plurality of voxels 60 is 2-dimensionally arranged, is formed on the hologram recording material 50. Here, the voxels 60 include color data regarding three colors corresponding to different locations of an actual 3D image.

As described above, in a general method of printing a 3D image based on a holographic 3D image printer, a red light, a green light, and a blue light are sequentially emitted, and the SLM 30 displays respective data corresponding to the colors. As a result, color data regarding the three colors is recorded to a same voxel 60 of the hologram recording material 50 in the form of a hologram.

However, the recording process may be lengthy to complete and a brightness of a 3D image is reduced due to deterioration of diffraction efficiency (DE) of a hologram. For example, a modulated refractive index of the hologram recording material 50 is from about $10^{-3}$ to about $10^{-1}$, where the modulated refractive index is closely related to DE. In a general voxel 2D array configuration, the modulated refractive index is recorded to the voxel 60 of FIG. 3 for each of the colors. As such, modulated refractive index per color of the general voxel 2D array configuration decreases.

SUMMARY

In one general aspect, there is provided a method of printing a holographic 3D image, the method including forming sub-voxels on a hologram recording material, the sub-voxels including one or more colors.

The method may further include forming a sub-voxel 2D array configuration including the formed sub-voxels.

The method may further include that each of the sub-voxels includes pieces of color data that are different from pieces of color data of adjacent ones of the sub-voxels.

The method may further include that each of the sub-voxels includes different pieces of location data.

The method may further include that, in the sub-voxel 2D array configuration, odd number rows of the formed sub-voxels are shifted by a predetermined distance from even number rows of the formed sub-voxels.

The method may further include that, in the sub-voxel 2D array configuration, odd number columns of the formed sub-voxels are shifted by a predetermined distance from even number columns of the formed sub-voxels.

The method may further include that the one or more colors include red, green, blue, or any combination thereof.

In another general aspect, there is provided a method of printing a holographic 3D image, the method including forming a first sub-voxel including a first color on a hologram recording material, forming a second sub-voxel including a second color on the hologram recording material, and forming a third sub-voxel including a third color on the hologram recording material.

The method may further include that the forming of the first sub-voxel includes emitting light of the first color to a first location on the hologram recording material via a spatial light modulator (SLM) on which the color data regarding the first color is displayed, the forming of the second sub-voxel includes emitting light of the second color to a second location on the hologram recording material via the SLM on which the color data regarding the second color is displayed, and the forming of the third sub-voxel includes emitting light of the third color to a third location on the hologram recording material via the SLM on which the color data regarding the third color is displayed.

The method may further include that the light of the first color is emitted by a first laser light source, the light of the second color is emitted by a second laser light source, and the light of the third color is emitted by a third laser light source.

The method may further include, after the forming of the first sub-voxel, moving the hologram recording material by a distance corresponding to a size of a sub-voxel, and, after the forming of the second sub-voxel, moving the hologram recording material by the distance corresponding to the size of the sub-voxel.

The method may further include repeatedly and sequentially forming the first, second, and third sub-voxels to form a sub-voxel 2D array configuration.

The method may further include that the first, second, and third sub-voxels are adjacently arranged.

The method may further include that each of the first, second, and third sub-voxels include different pieces of location data.

The method may further include that, in the sub-voxel 2D array configuration, odd number rows of the formed first, second, and third sub-voxels are shifted by a predetermined distance from even number rows of the formed first, second, and third sub-voxels.

The method may further include that, in the sub-voxel 2D array configuration, odd number columns of the formed first, second, and third sub-voxels are shifted by a predetermined distance from even number columns of the formed first, second, and third sub-voxels.

The method may further include that the first, second, and third colors include red, green, and blue, respectively.

In yet another general aspect, there is provided a method of printing a holographic 3D image, the method including forming a first sub-voxel including a first color and a second color on a hologram recording material, forming a second sub-voxel including the second color and a third color on the hologram recording material, and forming a third sub-voxel including the third color and the first color on the hologram recording material.

The method may further include that the forming of the first sub-voxel includes recording color data regarding the first color and color data regarding the second color to a first location on the hologram recording material.

The method may further include that the forming of the second sub-voxel includes recording color data regarding the second color and color data regarding the third color to a second location on the hologram recording material.

The method may further include the forming of the third sub-voxel includes recording color data regarding the third color and color data regarding the first color to a third location on the hologram recording material.

Other features and aspects may be apparent from the following detailed description, the drawings, and the claims.

Figure 1:
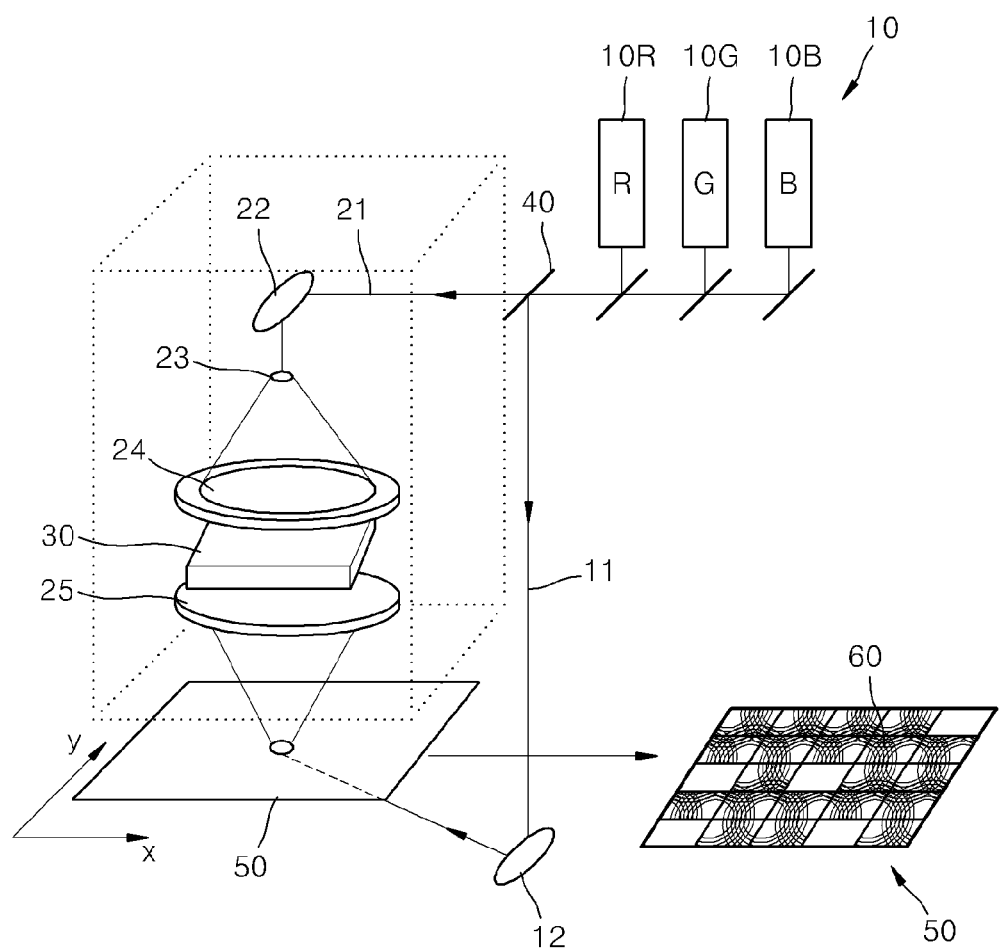
FIG. 1 is a schematic view illustrating an example of a general holographic 3D image printer.
Figure 2:
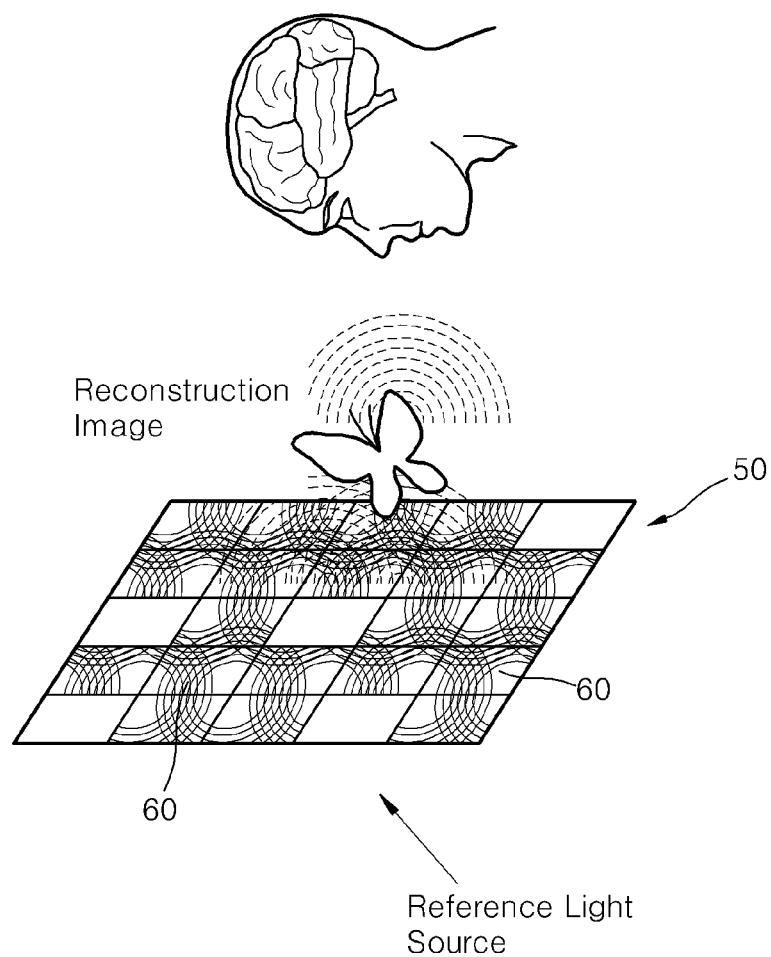
FIG. 2 is a diagram illustrating an example of a person recognizing a 3D image from a hologram recording material printed by the general holographic 3D image printer illustrated in FIG. 1

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness. As used herein, the term "and/or" includes any and all combinations of one or more of the associated listed items.

Figure 3:
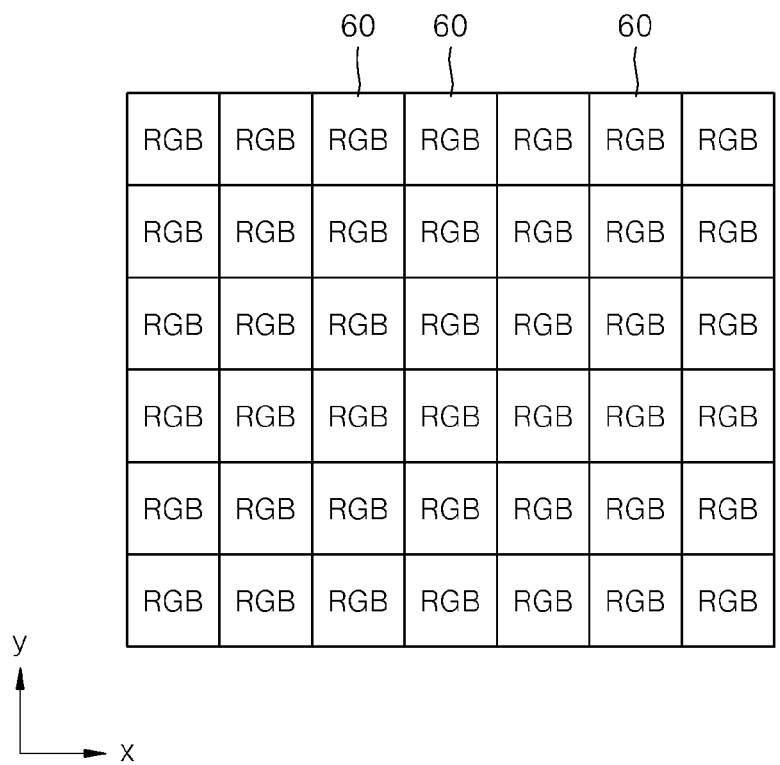
FIG. 3 is a diagram illustrating an example of a general voxel 2D array configuration formed on a hologram recording material.
Figure 4:
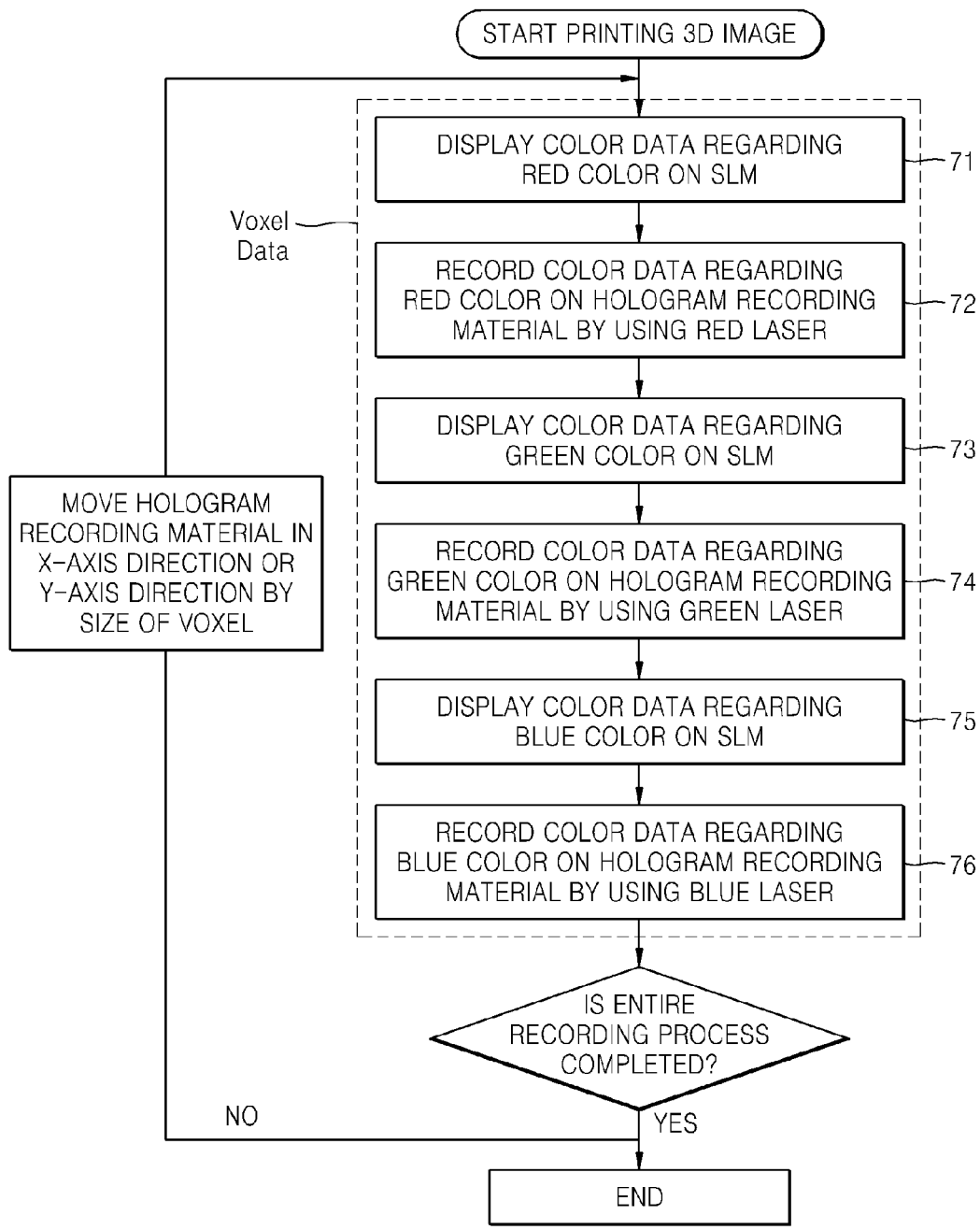
FIG. 4 is a flowchart illustrating an example of a method of forming the voxel 2D array configuration as illustrated in FIG. 3.
Figure 5:
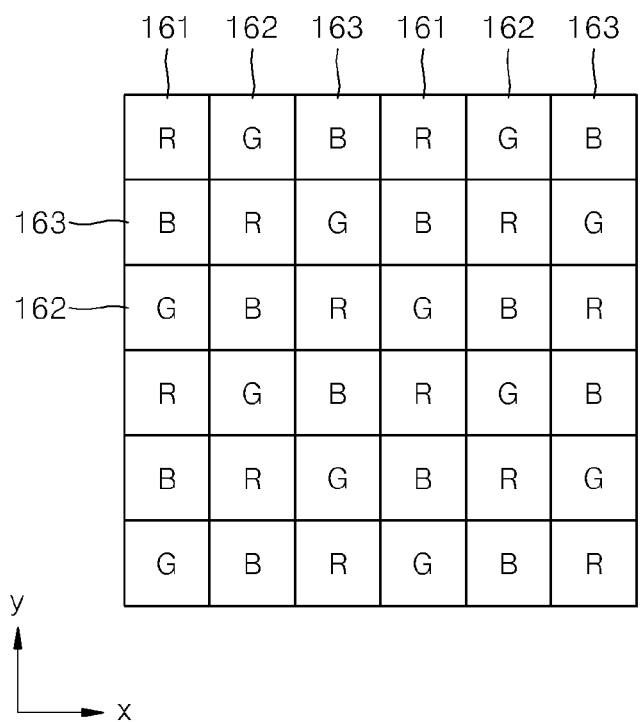
FIG. 5 is a diagram illustrating an example of a sub-voxel 2D array configuration formed on a hologram recording material based on a method of printing a holographic 3D image.

FIG. 5 is a diagram illustrating an example of a sub-voxel 2D array configuration formed on a hologram recording material based on a method of printing a holographic 3D image. Referring to the example illustrated in FIG. 5, a plurality of sub-voxels, namely, first, second, and third sub-voxels 161, 162, and 163, is 2-dimensionally arranged and form the sub-voxel 2D array configuration. Here, the first, second, and third sub-voxels 161, 162, and 163 include different pieces of data regarding locations of an actual 3D image. Further, the first, second, and third sub-voxels 161, 162, and 163 adjacent to each other include different pieces of color data. The first, second, and third sub-voxels 161, 162, and 163 refer to a volume pixel that includes data regarding one or two colors with respect to a unit volume of an actual 3D image. In other words, the voxel 60 of FIG. 3 includes color data of three or more colors at a predetermined location of an actual 3D image as described above, whereas each of the first, second, and third sub-voxels 161, 162, and 163 includes color data of one or two colors only. FIG. 5 shows the sub-voxel 2D array configuration in which each of the first, second, and third sub-voxels 161, 162, and 163 includes color data regarding only one color.

According to the example illustrated in FIG. 5, the sub-voxel 2D array configuration formed as the first, second, and third sub-voxels 161, 162, and 163 are sequentially and repeatedly arranged. The first sub-voxel 161 is a red sub-voxel including color data regarding red color. The second sub-voxel 162 is a green sub-voxel including color data regarding green color. The third sub-voxel 163 is a blue sub-voxel including color data regarding blue color.

The first, second, and third sub-voxels 161, 162, and 163 are not limited thereto and may include color data regarding various other colors. Further, in an example of the sub-voxel 2D array configuration, the first, second, and third sub-voxels 161, 162, and 163 adjacent to each other include color data regarding different colors, the second and third sub-voxels 162 and 163 may be arranged around the first sub-voxel 161, whereas the third and first sub-voxels 163 and 161 may be arranged around the second sub-voxel 162. In addition, the first and second sub-voxels 161 and 162 may be arranged around the third sub-voxel 163.

As described above, in the sub-voxel 2D array configuration according to the example illustrated in FIG. 5, each of the first, second, and third sub-voxels 161, 162, and 163 includes color data regarding only one color, and the first, second, and third sub-voxels 161, 162, and 163 adjacent to each other include color data and location data that are different from one another.

In another example, in a case where the sub-voxel 2D array configuration is a dense structure, 3D stereoscopic image data reproduced by the sub-voxel 2D array configuration has motion parallax data similar to that of a 2D image. Therefore, in an example, color of a predetermined location of an actual 3D stereoscopic image is embodied by combining the predetermined first, second, or third sub-voxel 161, 162, or 163 with the adjacent first, second, and/or third sub-voxels 161, 162, and/or 163 corresponding to different colors.

For example, the sub-voxel 2D array configuration in which color data regarding only one color is recorded to each of the first, second, and third sub-voxels 161, 162, and 163 has a modulated refractive index per color that increases, thereby serving to improve diffraction efficiency (DE) of the sub-voxel 2D array configuration and, subsequently, the brightness of a 3D image embodied by the sub-voxel 2D array configuration.

Figure 6:
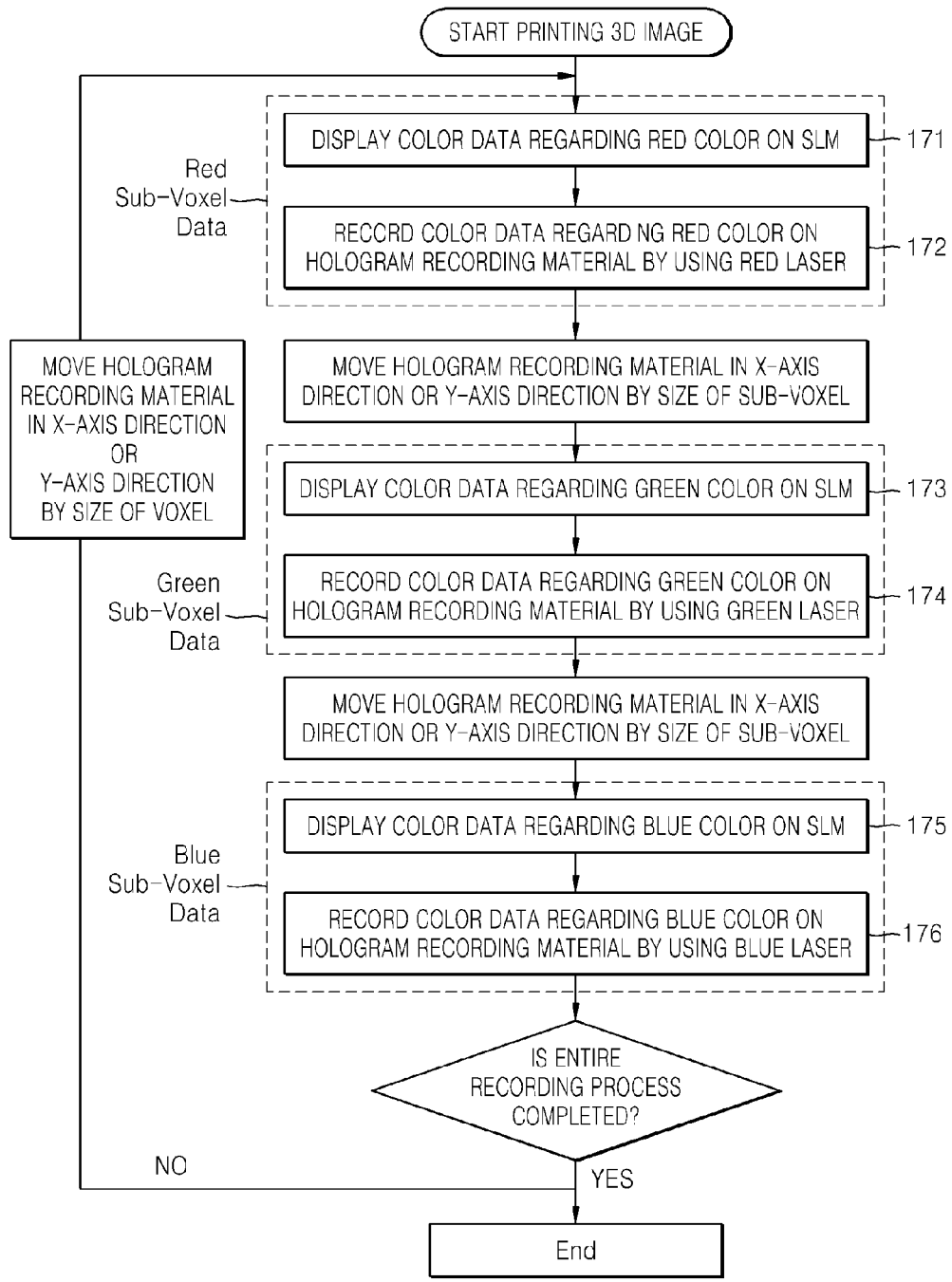
FIG. 6 is a flowchart illustrating an example of a method of printing a holographic 3D image, in a case where the sub-voxel 2D array configuration as illustrated according to the example in FIG. 5 is formed.

FIG. 6 is a flowchart illustrating an example of a method of printing a holographic 3D image, in a case where the sub-voxel 2D array configuration as illustrated according to the example in FIG. 5 is formed. Referring to the examples illustrated in FIGS. 1 and 6, after color data regarding red color of a predetermined location of an actual 3D image is displayed (171) on the SLM 30, the red laser light source 10R emits a red light that passes through the SLM 30 and records (172) color data regarding red color on the hologram recording material 50. Therefore, a red sub-voxel including color data regarding red color (the first sub-voxel 161) is formed on the hologram recording material 50. Next, the hologram recording material 50 is moved in the x-axis direction or the y-axis direction by the size of a sub-voxel.

After color data regarding green color of a predetermined location of an actual 3D image is displayed (173) on the SLM 30, the green laser light source 10G emits a green light that passes through the SLM 30 and records (174) color data regarding green color on the hologram recording material 50. Therefore, a green sub-voxel including color data regarding green color (the second sub-voxel 162) is formed on the hologram recording material 50 nearby the red sub-voxel 161. Next, the hologram recording material 50 is moved in the x-axis direction or the y-axis direction by the size of a sub-voxel.

After color data regarding blue color of a predetermined location of an actual 3D image is displayed (175) on the SLM 30, the blue laser light source 10B emits a blue light that passes through the SLM 30 and records (176) color data regarding blue color on the hologram recording material 50. Therefore, a blue sub-voxel including color data regarding blue color (the third sub-voxel 163) is formed on the hologram recording material 50 nearby the green sub-voxel

162. Next, the hologram recording material 50 is moved in the x-axis direction or the y-axis direction by the size of a sub-voxel, and the above operations are repeatedly performed. As a result, the red, green, and blue sub-voxels 161, 162, and 163 are sequentially and repeatedly formed on the hologram recording material 50. Therefore, a sub-voxel 2D array configuration is formed.

Figure 7:
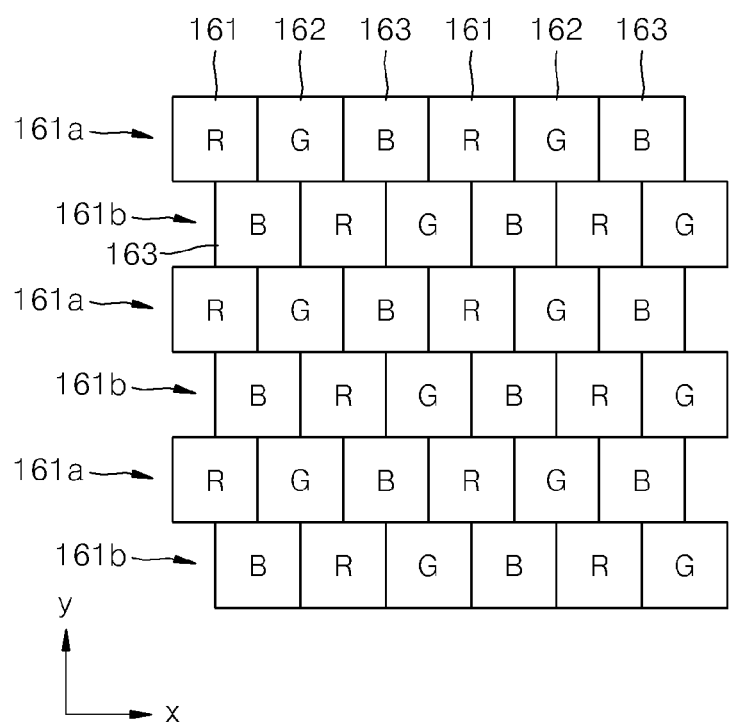
FIG. 7 is a diagram illustrating another example of a sub-voxel 2D array configuration formed on a hologram recording material based on a method of printing a holographic 3D image.

FIG. 7 is a diagram illustrating another example of a sub-voxel 2D array configuration formed on a hologram recording material based on a method of printing a holographic 3D image. Referring to the example illustrated in FIG. 7, a sub-voxel 2D array configuration includes the first, second, and third sub-voxels 161, 162, and 163, which are sequentially and repeatedly formed. While not being limited thereto, the first, second, and third sub-voxels 161, 162, and 163 are respectively red, green, and blue sub-voxels. Odd number sub-voxel rows 161a are shifted in the x-axis direction by a predetermined distance from even number sub-voxel rows 161b. In an example, the odd number sub-voxel rows 161a are shifted in the x-axis direction by a distance corresponding to half the size of a sub-voxel of the even number sub-voxel rows 161b. In another example, the second and third sub-voxels 162 and 163 are arranged around the first sub-voxel 161, and the third and first sub-voxels 163 and 161 are arranged around the second sub-voxel 162. In yet another example, the first and second sub-voxels 161 and 162 are arranged around the third sub-voxel 163.

Figure 8:
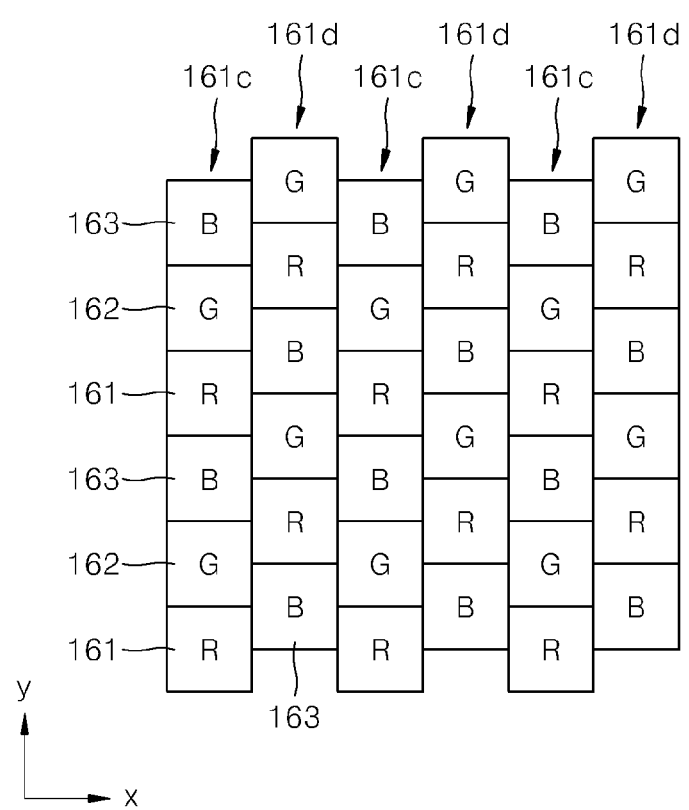
FIG. 8 is a diagram illustrating yet another example of a sub-voxel 2D array configuration formed on a hologram recording material based on a method of printing a holographic 3D image.

FIG. 8 is a diagram illustrating yet another example of a sub-voxel 2D array configuration formed on a hologram recording material based on a method of printing a holographic 3D image. Referring to the example illustrated in FIG. 8, a sub-voxel 2D array configuration includes the first, second, and third sub-voxels 161, 162, and 163, which are sequentially and repeatedly formed. While not being limited thereto, the first, second, and third sub-voxels 161, 162, and 163 are respectively red, green, and blue sub-voxels. Odd number sub-voxel columns 161c are shifted in the y-axis direction by a predetermined distance from even number sub-voxel columns 161d. While not being limited thereto, the odd number sub-voxel rows 161c are shifted in the y-axis direction by a distance corresponding to half the size of a sub-voxel of the even number sub-voxel rows 161d. In an example, the second and third sub-voxels 162 and 163 are arranged around the first sub-voxel 161, and the third and first sub-voxels 163 and 161 are arranged around the second sub-voxel 162. In another example, the first and second sub-voxels 161 and 162 are arranged around the third sub-voxel 163.

Figure 9:
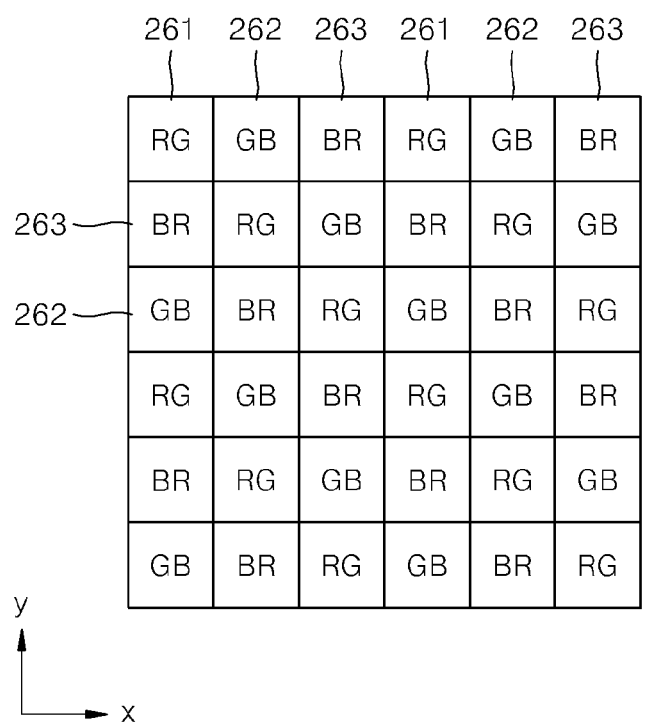
FIG. 9 is a diagram illustrating still another example of a sub-voxel 2D array configuration formed on a hologram recording material based on a method of printing a holographic 3D image.

FIG. 9 is a diagram illustrating still another example of a sub-voxel 2D array configuration formed on a hologram recording material based on a method of printing a holographic 3D image. Referring to the example illustrated in FIG. 9, the sub-voxel 2D array configuration includes first, second, and third sub-voxels 261, 262, and 263 that are 2-dimensionally arranged. Here, the first, second, and third sub-voxels 261, 262, and 263 include different pieces of data regarding locations of an actual 3D image. Furthermore, the first, second, and third sub-voxels 261, 262, and 263 adjacent to each other include different pieces of color data. The first, second, and third sub-voxels 261, 262, and 263 refer to a volume pixel that includes data regarding one or two colors with respect to a unit volume of an actual 3D image. FIG. 9 shows the sub-voxel 2D array configuration in which each of the first, second, and third sub-voxels 261, 262, and 263 includes color data regarding two colors.

For example, in FIG. 9, the sub-voxel 2D array configuration includes the first, second, and third sub-voxels 261, 262, and 263, which are sequentially and repeatedly arranged. The first sub-voxel 261 includes color data regarding first and second colors, e.g., red and green colors, whereas the second sub-voxel 262 includes color data regarding second and third colors, e.g., green and blue colors. Furthermore, the third sub-voxel 263 includes color data regarding third and first colors, e.g., blue and red colors. However, they are merely examples, and each of the first, second, and third sub-voxels 261, 262, and 263 may include color data regarding two other colors.

Further, in the sub-voxel 2D array configuration as described above, the first, second, and third sub-voxels 261, 262, and 263 adjacent to each other include color data regarding different colors. In an example, the second and third sub-voxels 262 and 263 are arranged around the first sub-voxel 261, whereas the third and first sub-voxels 263 and 261 are arranged around the second sub-voxel 262. Moreover, the first and second sub-voxels 261 and 262 are arranged around the third sub-voxel 263.

As described above, in the sub-voxel 2D array configuration shown in FIG. 9, each of the first, second, and third sub-voxels 261, 262, and 263 includes color data regarding two colors, and the first, second, and third sub-voxels 261, 262, and 263 adjacent to each other include color data and location data that are different from one another, thereby serving to improve brightness and high-quality color rendition.

A method of printing a holographic 3D image configured to form the sub-voxel 2D array configuration according to the example illustrated in FIG. 9 will be described below with reference to FIG. 1.

After color data regarding red color of a predetermined location of an actual 3D image is displayed on the SLM 30, the red laser light source 10R emits a red light that passes through the SLM 30 and records color data regarding red color on the hologram recording material 50. After color data regarding green color of a predetermined location of an actual 3D image is displayed on the SLM 30, the green laser light source 10G emits a green light that passes through the SLM 30 and records color data regarding green color on the hologram recording material 50 on which the color data regarding red color is recorded. Therefore, the first sub-voxel 261 including color data regarding red color and color data regarding green color is formed on the hologram recording material 50. Next, the hologram recording material 50 is moved in the x-axis direction or the y-axis direction by the size of a sub-voxel.

After color data regarding green color of a predetermined location of an actual 3D image is displayed on the SLM 30, the green laser light source 10G emits a green light that passes through the SLM 30 and records color data regarding green color on the hologram recording material 50. After color data regarding blue color of a predetermined location of an actual 3D image is displayed on the SLM 30, the blue laser light source 10B emits a blue light that passes through the SLM 30 and records color data regarding blue color on the hologram recording material 50 on which the color data regarding green color is recorded. Therefore, the second sub-voxel 262 including color data regarding green color and color data regarding blue color is formed on the hologram recording material 50. Next, the hologram recording material 50 is moved in the x-axis direction or the y-axis direction by the size of a sub-voxel.

After color data regarding blue color of a predetermined location of an actual 3D image is displayed on the SLM 30, the blue laser light source 10B emits a blue light that passes through the SLM 30 and records color data regarding blue color on the hologram recording material 50. After color data regarding red color of a predetermined location of an actual 3D image is displayed on the SLM 30, the red laser light source 10R emits a red light emitted that passes through the SLM 30 and records color data regarding red color on the hologram recording material 50 on which the color data regarding red color is recorded. Therefore, the third sub-voxel 263 including color data regarding blue color and color data regarding red color is formed on the hologram recording material 50. Next, after the hologram recording material 50 is moved in the x-axis direction or the y-axis direction by the size of a sub-voxel, and the above operations are repeatedly performed. As a result, the first, second, and third sub-voxels 261, 262, and 263 are sequentially and repeatedly formed on the hologram recording material 50. Therefore, a sub-voxel 2D array configuration is formed. In various examples, the first sub-voxel 261 includes color data regarding red and green colors, the second sub-voxel 262 includes color data regarding green and blue colors, and the third sub-voxel 263 includes color data regarding blue and red colors.

Figure 10:
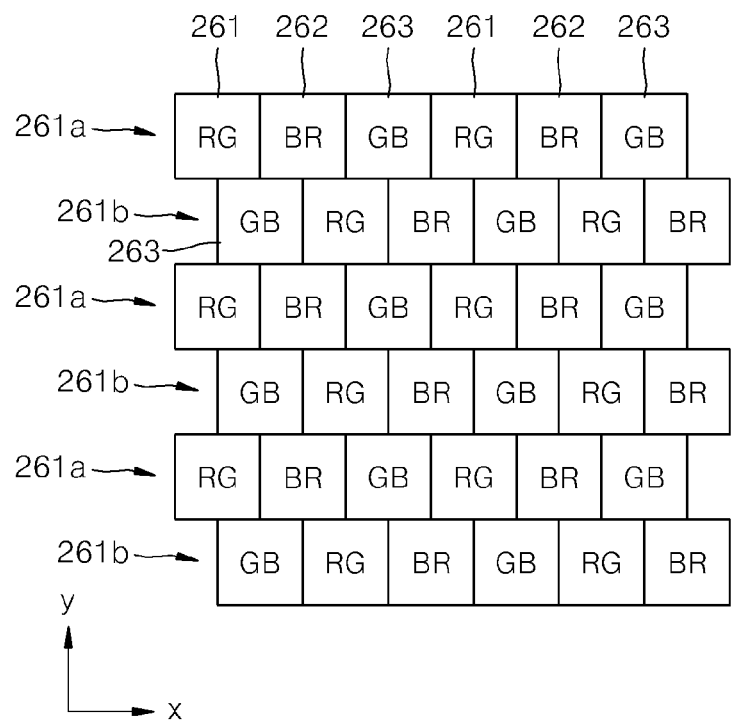
FIG. 10 is a diagram illustrating a further example of a sub-voxel 2D array configuration formed on a hologram recording material based on a method of printing a holographic 3D image.

FIG. 10 is a diagram illustrating a further example of a sub-voxel 2D array configuration formed on a hologram recording material based on a method of printing a holographic 3D image. Referring to the example illustrated in FIG. 10, the sub-voxel 2D array configuration includes first, second, and third sub-voxels 261, 262, and 263 that are sequentially and repeatedly formed. Here, the first sub-voxel 261 includes color data regarding first and second colors, e.g., red and green colors, whereas the second sub-voxel 262 includes color data regarding second and third colors, e.g., blue and red colors. Furthermore, the third sub-voxel 263 includes color data regarding third and first colors, e.g., green and blue colors. However, they are merely examples, and each of the first, second, and third sub-voxels 261, 262, and 263 may include color data regarding two other colors.

According to the example illustrated in FIG. 10, odd number sub-voxel rows 261a are shifted in the x-axis direction by a predetermined distance from even number sub-voxel rows 261b. In an example, while not being limited thereto, the odd number sub-voxel rows 261a is shifted in the x-axis direction by a distance corresponding to half the size of a sub-voxel of the even number sub-voxel rows 261b. In another example, the second and third sub-voxels 262 and 263 are arranged around the first sub-voxel 261, and the third and first sub-voxels 263 and 261 are arranged around the second sub-voxel 262. In yet another example, the first and second sub-voxels 261 and 262 are arranged around the third sub-voxel 263.

Figure 11:
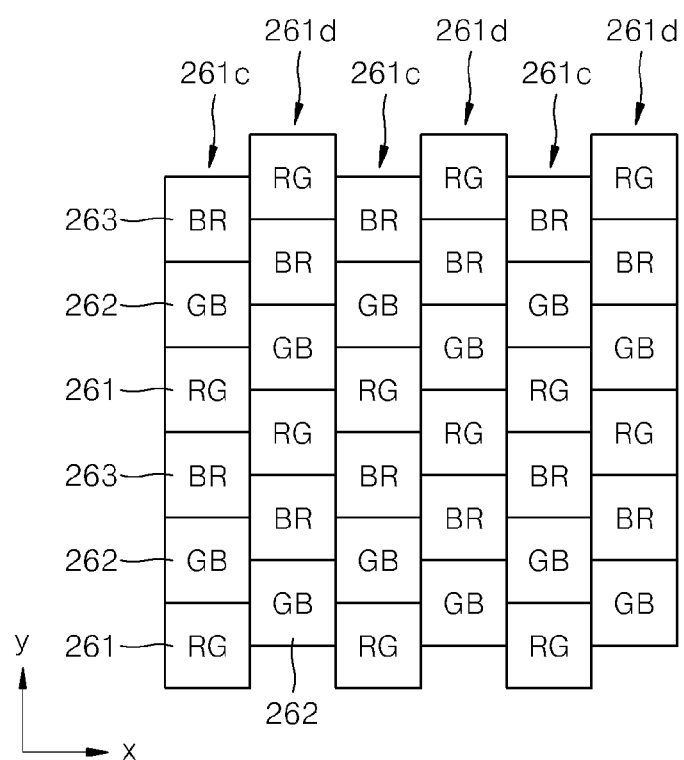
FIG. 11 is a diagram illustrating an additional example of a sub-voxel 2D array configuration formed on a hologram recording material based on a method of printing a holographic 3D image.

FIG. 11 is a diagram illustrating an additional example of a sub-voxel 2D array configuration formed on a hologram recording material based on a method of printing a holographic 3D image. Referring to the example illustrated in FIG. 11, the sub-voxel 2D array configuration include first, second, and third sub-voxels 261, 262, and 263, which are sequentially and repeatedly formed. Here, the first sub-voxel 261 includes color data regarding first and second colors, e.g., red and green colors, whereas the second sub-voxel 262 includes color data regarding second and third colors, e.g., green and blue colors. Furthermore, the third sub-voxel 263 includes color data regarding third and first colors, e.g., blue and red colors. However, they are merely examples, and each of the first, second, and third sub-voxels 261, 262, and 263 may include color data regarding two other colors.

According to the example illustrated in FIG. 11, odd number sub-voxel columns 261c are shifted in the y-axis direction by a predetermined distance from even number sub-voxel columns 261d. Here, while not limited thereto, the odd number sub-voxel rows 261c are shifted in the y-axis direction by a distance corresponding to half the size of a sub-voxel of the even number sub-voxel rows 261d. In an example, the second and third sub-voxels 262 and 263 are arranged around the first sub-voxel 261, and the third and first sub-voxels 263 and 261 are arranged around the second sub-voxel 262. In another example, the first and second sub-voxels 261 and 262 are arranged around the third sub-voxel 263.

In the above examples, while not being limited thereto, a predetermined color is embodied by combining three colors, that is, red, green, and blue. In another example, a predetermined color is embodied by combining four or more colors. Furthermore, in the above examples, the sub-voxel 2D array configuration in which each of the first, second, and third sub-voxels 161, 162, and 163 includes color data regarding only one color or the sub-voxel 2D array configuration in which each of the first, second, and third sub-voxels 261, 262, and 263 includes color data regarding two colors is provided. However, in another example of a single sub-voxel 2D array configuration, each of some of sub-voxels include color data regarding only one color, whereas each of the other sub-voxels include color data regarding two colors.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of recording a holographic 3D image, the method comprising:
    forming a first sub-voxel on a hologram recording material, wherein said forming of the first sub-voxel comprises
        passing a first light through a spatial light modulator (SML); and
        recording color data of the first light on the first sub-voxel of the hologram recording material;
    moving the hologram recording material by a distance corresponding to a size of a sub-voxel;
    forming a second sub-voxel on a hologram recording material, wherein said forming of the second sub-voxel comprises
        passing a second light through the SML; and
        recording color data of the second light on the second sub-voxel of the hologram recording material,
    wherein each of the first and second sub-voxels consists of one or two colors.

2. The method of claim 1, further comprising:
    forming additional sub-voxels by iteratively repeating the forming and moving; and
    forming a sub-voxel 2D array configuration comprising the first sub-voxel, the second sub-voxel, and the additional sub-voxels.

3. The method of claim 2, wherein each of the first sub-voxel, the second sub-voxel, and the additional sub-voxels comprises pieces of color data that is different from a piece of color data of an adjacent sub-voxel in the 2D array configuration.

4. The method of claim 3, wherein each of the first sub-voxel, and the second sub-voxel, and the additional sub-voxels comprises a different piece of location data.

5. The method of claim 2, wherein, in the sub-voxel 2D array configuration, odd number rows of sub-voxels are shifted by a predetermined distance from even number rows of sub-voxels.

6. The method of claim 2, wherein, in the sub-voxel 2D array configuration, odd number columns of sub-voxels are shifted by a predetermined distance from even number columns of sub-voxels.

7. The method of claim 1, wherein the one or two colors are selected from a group consisting essentially of red, green, and blue.

8. A method of recording a holographic 3D image, the method comprising:
emitting a first light, a second light, and a third light from a first light source, a second light source, and a third light source, respectively;
splitting the first light into a first reference light and a first material light;
splitting the second light into a second reference light and a second material light;
splitting the third light into a third reference light and a third material light;
forming a first sub-voxel corresponding to the first material light and consisting of a first color on a hologram recording material;
moving the hologram recording material by a distance corresponding to a size of a sub-voxel;
forming a second sub-voxel corresponding to the second material light and consisting of a second color on the hologram recording material;
moving the hologram recording material by the distance corresponding to the size of the sub-voxel; and
forming a third sub-voxel corresponding to the third material light and consisting of a third color on the hologram recording material.

9. The method of claim 8, wherein the forming of the first sub-voxel comprises emitting the first material light of the first color to a first location on the hologram recording material via a spatial light modulator (SLM) on which color data of the first color is displayed,
wherein the forming of the second sub-voxel comprises emitting the second material light of the second color to a second location on the hologram recording material via the SLM on which color data of the second color is displayed, and
wherein the forming of the third sub-voxel comprises emitting the third material light of the third color to a third location on the hologram recording material via the SLM on which color data of the third color is displayed.

10. The method of claim 9, wherein the light of the first color is emitted by a first laser light source,
wherein the light of the second color is emitted by a second laser light source, and
wherein the light of the third color is emitted by a third laser light source.

11. The method of claim 8, further comprising:
repeatedly and sequentially forming the first, second, and third sub-voxels to form a sub-voxel 2D array configuration.

12. The method of claim 11, wherein the first, second, and third sub-voxels are adjacently arranged.

13. The method of claim 11, wherein each of the first, second, and third sub-voxels comprises a different piece of location data.

14. The method of claim 11, wherein, in the sub-voxel 2D array configuration, odd number rows of the first, second, and third sub-voxels are shifted by a predetermined distance from even number rows of the first, second, and third sub-voxels.

15. The method of claim 11, wherein, in the sub-voxel 2D array configuration, odd number columns of the first, second, and third sub-voxels are shifted by a predetermined distance from even number columns of the first, second, and third sub-voxels.

16. The method of claim 8, wherein the first, second, and third colors are red, green, and blue, respectively.

17. A method of printing a holographic 3D image, the method comprising:
forming a first sub-voxel comprising a first color and a second color on a hologram recording material;
moving the hologram recording material by a distance corresponding to a size of a sub-voxel;
forming a second sub-voxel comprising the second color and a third color on the hologram recording material;
moving the hologram recording material by the distance corresponding to the size of the sub-voxel; and
forming a third sub-voxel comprising the third color and the first color on the hologram recording material.

18. The method of claim 17, wherein the forming of the first sub-voxel comprises recording color data regarding the first color and color data regarding the second color to a first location on the hologram recording material.

19. The method of claim 17, wherein the forming of the second sub-voxel comprises recording color data regarding the second color and color data regarding the third color to a second location on the hologram recording material.

20. The method of claim 17, wherein the forming of the third sub-voxel comprises recording color data regarding the third color and color data regarding the first color to a third location on the hologram recording material.

21. The method of claim 17, further comprising:
repeatedly and sequentially forming the first, second, and third sub-voxels to form the sub-voxel 2D array configuration.

22. The method of claim 21, wherein the first, second, and third sub-voxels are adjacently arranged.

23. The method of claim 21, wherein each of the first, second, and third sub-voxels comprise a different piece of location data.

24. The method of claim 21, wherein, in the sub-voxel 2D array configuration, odd number rows of the first, second, and third sub-voxels are shifted by a predetermined distance from even number rows of the first, second, and third sub-voxels.

25. The method of claim 21, wherein, in the sub-voxel 2D array configuration, odd number columns of the first, second, and third sub-voxels are shifted by a predetermined distance from even number columns of the first, second, and third sub-voxels.

26. The method of claim 17, wherein the first, second, and third colors comprise red, green, and blue, respectively.

* * * * *